(12) United States Patent
Mueller et al.

(10) Patent No.: US 8,992,145 B1
(45) Date of Patent: Mar. 31, 2015

(54) MULTI-KEY DUPLICATION, IDENTIFICATION AND CUTTING MACHINE WITH CLAMP

(75) Inventors: Mike Mueller, Phoenix, AZ (US); George Lynn Hagen, Las Vegas, NV (US); Scott Basham, Chandler, AZ (US); Mark Tarter, Mesa, AZ (US); Ryan Hamblin, Junction, AZ (US); Carl Ito, Scottsdale, AZ (US); Kenneth C. Booth, Mesa, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 670 days.

(21) Appl. No.: 13/291,934

(22) Filed: Nov. 8, 2011

Related U.S. Application Data

(63) Continuation-in-part of application No. 13/183,982, filed on Jul. 15, 2011.

(60) Provisional application No. 61/411,401, filed on Nov. 8, 2010, provisional application No. 61/432,089, filed on Jan. 12, 2011.

(51) Int. Cl.
*B23C 3/35* (2006.01)

(52) U.S. Cl.
CPC .. *B23C 3/35* (2013.01); *B23C 3/355* (2013.01)
USPC .............................................. 409/81; 409/83

(58) Field of Classification Search
CPC .................................. B23C 3/35; B23C 3/355
USPC .............................. 409/81–83; 206/37.1, 758
See application file for complete search history.

(56) References Cited

U.S. PATENT DOCUMENTS

| | | | | |
|---|---|---|---|---|
| 1,135,676 A | * | 4/1915 | Engelbert | 409/81 |
| 1,165,099 A | * | 12/1915 | Hoernel | 409/81 |
| 1,462,150 A | * | 7/1923 | Segal | 409/81 |
| 1,697,747 A | * | 1/1929 | Bachmann | 409/81 |
| 2,148,667 A | | 2/1939 | Yoskowitz et al. | |
| 2,682,809 A | * | 7/1954 | May | 409/81 |
| 3,116,665 A | | 1/1964 | Reisner | |
| 3,323,420 A | | 6/1967 | Roxburgh | |
| 3,358,561 A | | 12/1967 | Roxburgh et al. | |
| 3,413,892 A | | 12/1968 | Casey et al. | |
| 3,442,174 A | | 5/1969 | Weiner et al. | |
| 3,496,636 A | * | 2/1970 | Lieptz | 30/131 |
| 3,602,092 A | | 8/1971 | Richens | |
| 3,682,041 A | | 8/1972 | Essig | |
| 3,748,940 A | * | 7/1973 | Muri | 83/414 |

(Continued)

FOREIGN PATENT DOCUMENTS

| | | | | |
|---|---|---|---|---|
| CA | 2365738 A1 | * | 9/2000 | B23C 3/35 |
| DE | 102005027102 A1 | * | 12/2006 | B23C 3/35 |

(Continued)

*Primary Examiner* — Daniel Howell
*Assistant Examiner* — Ryan Rufo
(74) *Attorney, Agent, or Firm* — Finnegan, Henderson, Farabow, Garrett & Dunner LLP

(57) ABSTRACT

A key duplication system comprising a key duplication housing wherein at least one key receiving aperture on a first side of the housing sized to receive a key blade and at least one key clamp adjacent to the at least one key receiving aperture, the clamp comprising a first clamp arm with a surface topography corresponding to a first key blade surface topography and a second clamp arm with a surface topography corresponding to a second key blade different from the first key blade.

13 Claims, 6 Drawing Sheets

(56) References Cited

U.S. PATENT DOCUMENTS

| | | | |
|---|---|---|---|
| 3,796,130 A | | 3/1974 | Gartner |
| 3,865,011 A | | 2/1975 | Patriquin |
| 3,978,764 A | | 9/1976 | Patriquin |
| 4,159,783 A | | 7/1979 | Crasnianski |
| 4,666,351 A | | 5/1987 | Marchal |
| 4,741,652 A | | 5/1988 | Marchal |
| 4,752,876 A | | 6/1988 | Couch et al. |
| 5,167,171 A | * | 12/1992 | Heredia .................. 76/110 |
| 5,172,829 A | | 12/1992 | Dellicker, Jr. |
| 5,443,339 A | * | 8/1995 | Heredia et al. .............. 409/81 |
| 5,671,523 A | * | 9/1997 | Juchinewicz ................. 29/559 |
| 5,807,042 A | | 9/1998 | Almblad et al. |
| 6,839,449 B1 | * | 1/2005 | Campbell et al. ............. 382/100 |
| 8,287,215 B2 | * | 10/2012 | Freeman et al. ............... 409/81 |
| 2002/0141843 A1 | * | 10/2002 | Mueller et al. ................ 409/132 |
| 2007/0224008 A1 | * | 9/2007 | Bass et al. .................... 409/132 |
| 2008/0145163 A1 | * | 6/2008 | Freeman et al. ............... 409/83 |

FOREIGN PATENT DOCUMENTS

| | | | | |
|---|---|---|---|---|
| EP | 0362007 A2 | * | 4/1990 | ............... B23C 3/35 |
| WO | WO2008/066857 A2 | | 6/2008 | |

\* cited by examiner

MULTI-KEY DUPLICATION, IDENTIFICATION AND CUTTING MACHINE WITH CLAMP

CROSS REFERENCE TO RELATED APPLICATIONS

This application is a continuation-in-part application of U.S. patent application Ser. No. 13/183,982 to Mueller et al. entitled "Key Blank and Carrier Adapted for Positioning a Key Blank in a Cutter During Bit Cutting," which was filed on Jul. 15, 2011, the disclosure of which is hereby incorporated herein by reference. This document also claims the benefit of the filing dates of U.S. Provisional Patent Applications: 61/411,401 to Mueller et al. entitled "Two-Key Duplication ID and Cutting Machine with Specialized Clamp" which was filed on Nov. 8, 2010, and 61/432,089 to Hagen et al. entitled "Key Duplication Identification Systems and Cutting Machines and Related Methods," which was filed Jan. 12, 2011, the disclosures of all of which are hereby incorporated herein in their entirety by this reference.

BACKGROUND

1. Technical Field

Aspects of this document relate to public use key cutting and key duplication machines for reproducing keys. More specific implementations relate to simplified key duplication systems for identifying a predetermined number of keys for duplication.

2. Background Art

Conventionally, key cutting and key duplication machines are used to copy a key by cutting a bit pattern of a master key onto a key blank. Prior arts use mechanical cutting methods to determine a master key bit pattern. Method such as tracer bars, stylus, or other types of mechanical arm are used to trace a master key bit pattern. A trained operator conventionally was required to eyeball both of master key and key blank and verify whether both keys are the same size and whether they comprise identical groves before attempting to cut the key. Once the key groves and key shape are verified, the master key and the key blank are placed in a key cutting machine such that the master key faces a stylus or a tracer bar and the key blank faces a cutting wheel.

After the keys are securely gripped by the key cutting machine, a carriage is manually shifted longitudinally along supporting shaft to trace the master key bit pattern so that the cutting wheel cuts the identical key pattern into the corresponding key blank. The key blank cut with the master key pattern is then removed from the grip and buffed on a buffing wheel to remove any burrs.

An example of an elaborate system used to assist a trained worker in selecting an appropriate key blank and appropriately positioning the appropriate key blank and master key for cutting is disclosed in U.S. Pat. No. 5,443,339 to Heredia et al., titled "Method and Apparatus for Aligning and Cutting Single-sided and Double Sided Keys." More recent master key identification systems, such as that disclosed in U.S. Pat. No. 6,836,553 to Campbell et al., titled "Key Identification System," the disclosure of which is hereby incorporated herein by reference, automatically identifies the appropriate key blank and indicates that number for key selection.

A recent key duplication system described in International Application Number PCT/US2007/024522 to Freeman, et al. titled "Fully Automatic Key Duplicating Machine with Automatic Key Model Identification System" sought to reduce the need for the operation skills of a trained worker by automatically identifying master keys and automatically cutting and dispensing a duplicate key from a limited selection of keys within the key duplication system. Another recent key duplication system described in U.S. Pat. No. 7,890,878 to Bass et al., titled "Object Identification System," discloses a system that identifies an appropriate key blank by flashing a light adjacent the appropriate key blank on a product display next to a key blank cutter so that the consumer or a trained worker can select the appropriate key for insertion into the key blank cutter.

More than sixty percent of keys duplicated in United States are made either by SCHLAGE and KWIKSET manufacturers. Complex cutting machines not only aggravate issues pertinent to key cutting among consumers, such as key miscuts, they also tend to confuse a consumer with their intricacies and the skill required to operate.

SUMMARY

A first aspect of the disclosure comprises a key duplication system comprising a key duplication housing, at least one key receiving aperture on a first side of the housing sized to received a key blade, and at least one key clamp immediately adjacent to the at least one key blank receiving aperture such that a key blade inserted into the key receiving aperture extends into the at least one key clamp between a first clamp arm having a first surface topography shaped to mate with a keyway groove of a first key model and a second clamp arm having a second surface topography shaped to mate with a keyway groove of a second key model different from the first, wherein when the at least one key clamp is closed on the key blade by moving the first clamp arm and the second clamp arm together, one of the first surface topography and the second surface topography securely mates with a keyway groove of the key blade to secure the key at a known position and orientation within the key receiving aperture.

Particular implementations and embodiments may comprise one or more of the following. The first surface topography may be shaped to mate with a keyway groove of a Schlage key. The second surface topography may be shaped to mate with a keyway groove of a Kwikset key. The at least one key clamp may be a key blank clamp positioned immediately adjacent at least one key cutter. A first master key receiving aperture may be mounted on the housing and shaped to receive and identify a key blade of the first key model, and a second master key receiving aperture may be mounted on the housing and shaped to receive and identify a key blade of the second key model. The first master key receiving aperture may be shaped to receive a Schlage key and the second master key receiving aperture is shaped to receive a Kwikset key. A third master key receiving aperture may be mounted on the housing and the system may further comprise at least a second key clamp immediately adjacent to the third master key receiving aperture such that a master key blade inserted into the third master key receiving aperture extends into the second key clamp between a third clamp arm having the first surface topography shaped to mate with the keyway groove of the first key model and a fourth clamp arm having the second surface topography shaped to mate with the keyway groove of the second key model, wherein when the second key clamp is closed on the master key blade by moving the third clamp arm and the fourth clamp arm together, one of the first surface topography and the second surface topography securely mates with a keyway groove of the master key blade to secure the master key at a known position and orientation within the third master key receiving aperture. The system may further comprise a second key receiving aperture mounted on the housing, at least a second key clamp immediately adjacent to the second key receiving aperture such that a second key blade inserted into the second key receiving aperture extends into the second key clamp between a third clamp arm having the first surface topography shaped to mate with the keyway groove of the first key model and a fourth clamp arm having the second surface topography shaped to mate with the keyway groove of the second key model, wherein when the second key clamp is closed on the second key blade by moving the third clamp arm and the fourth clamp arm together, one of the first surface topography and the second surface topography securely mates with a keyway groove of the second key blade to secure the second key at a known position and orientation within the second key receiving aperture. Each of the first surface topography and the second surface topography may comprise a keyway groove guide extending a majority of a length of the key blade when inserted. The system may further comprise at least one sensor positioned adjacent at least one of the keyway groove guides, the sensor configured for sensing the presence of the key. The system may further comprise a key vending system coupled to the housing.

According to another aspect of the disclosure, a key duplication system may comprise a key identifier within a key duplication system housing, and a key cutter within the key duplication system housing, the cutter responsive the identifier to cut a key bit pattern of a master key positioned in the key identifier into a blade of a first key blank positioned in a key blank clamp adjacent the key cutter, wherein the key blank clamp comprises a first clamp arm having a first surface topography shaped to mate with a keyway groove of the first key blank blade and a second clamp arm having a second surface topography shaped to mate with a keyway groove of a second key blank blade different from the first and to not mate with the keyway groove of the first key blank blade, and wherein when the key clamp is closed on the first key blank blade by moving the first clamp arm and the second clamp arm together, the first surface topography securely mates with the keyway groove of the first key blade to secure the first key blank at a known position and orientation in relation to the key cutter.

Particular implementations and embodiments may comprise one or more of the following. The first key blank may be a Schlage key blank. The second key blank may be a Kwikset key blank. The key identifier may comprise first and second master key receiving apertures, each comprising a keyway shaped to receive one of the first key blank blade or the second key blank blade. The first master key receiving aperture keyway may be shaped to receive a Schlage key and the second master key receiving aperture keyway may be shaped to receive a Kwikset key. The system may comprise a third master key receiving aperture mounted on the housing, and at least a second key clamp immediately adjacent to the third master key receiving aperture such that a master key blade inserted into the third master key receiving aperture extends into the second key clamp between a third clamp arm having the first surface topography shaped to mate with the keyway groove of the first key blank blade and a fourth clamp arm having the second surface topography shaped to mate with the keyway groove of the second key blank blade, wherein when the second key clamp is closed on the master key blade by moving the third clamp arm and the fourth clamp arm together, one of the first surface topography and the second surface topography securely mates with a keyway groove of the master key blade to secure the master key at a known position and orientation within the third master key receiving aperture. The system may further comprise a master key receiving aperture mounted on the housing, and at least a second key clamp immediately adjacent to the master key receiving aperture such that a master key blade inserted into the master key receiving aperture extends into the second key clamp between a third clamp arm having the first surface topography shaped to mate with the keyway groove of the first key blank blade and a fourth clamp arm having the second surface topography shaped to mate with the keyway groove of the second key blank blade, wherein when the second key clamp is closed on the master key blade by moving the third clamp arm and the fourth clamp arm together, one of the first surface topography and the second surface topography securely mates with a keyway groove of the master key blade to secure the master key at a known position and orientation within the master key receiving aperture. Each of the first surface topography and the second surface topography may comprise a keyway groove guide extending a majority of a length of the key blade when inserted. The system may further comprise at least one sensor positioned adjacent at least one of the keyway groove guides, the sensor configured for sensing the presence of the key.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Particular illustrative implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended key duplication systems and/or assembly procedures for key duplication systems will become apparent from this disclosure. Accordingly, for example, although particular key duplication systems and components are disclosed, such systems and implementing components may comprise any shape, size, style, type, model, version, measurement, concentration, material, quantity, and/or the like as is known in the art for such systems and implementing components, consistent with the intended operation of a key duplication system.

Figure 1:
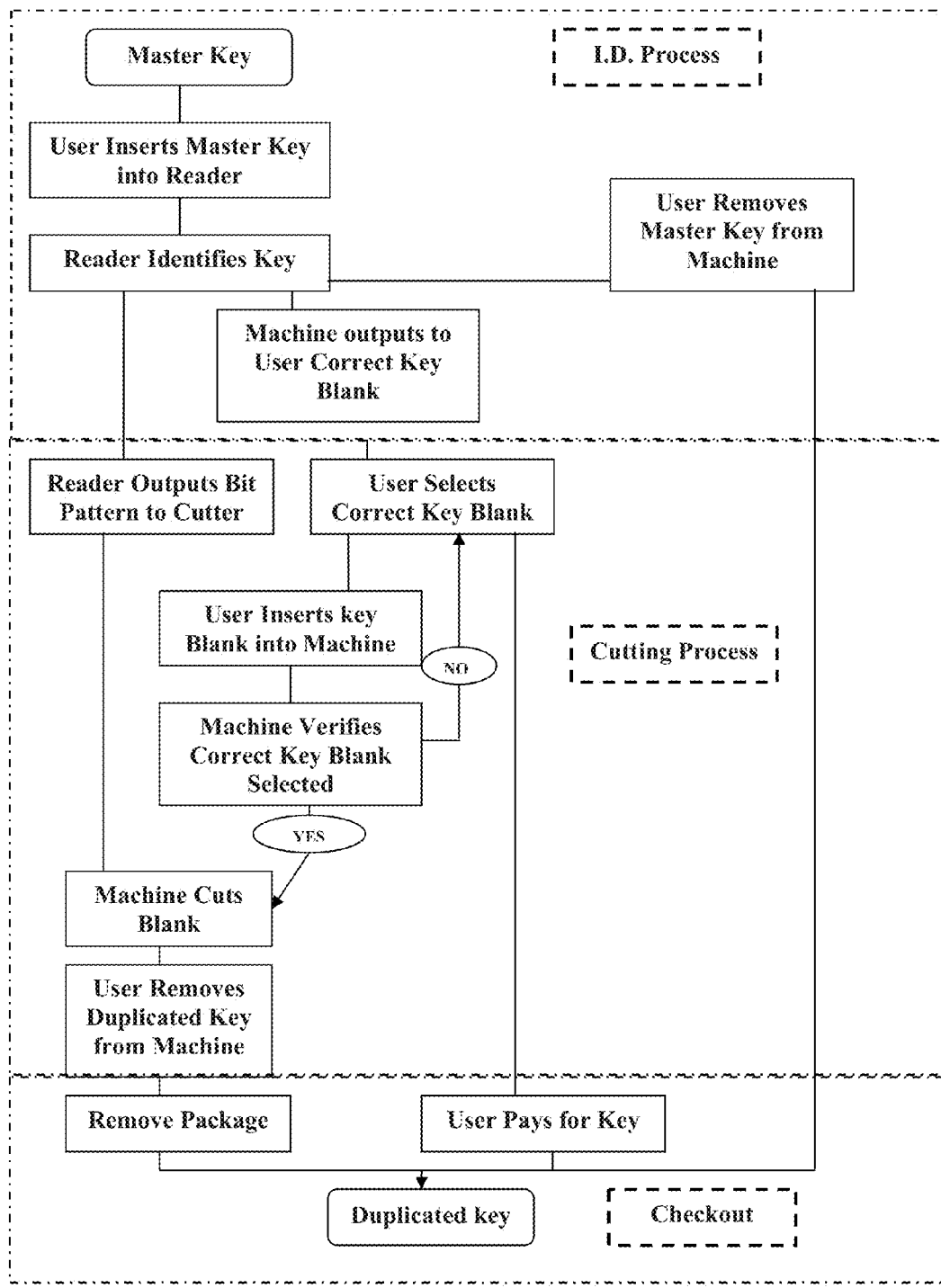
FIG. 1 is a block diagram of a specific key duplication process.

An overview for a process of enabling a consumer to cut its own duplicate key is illustrated in FIG. 1. In particular embodiments of key duplication system, a key blank receiving aperture receives a key blank solely or contained in a carrier and securely holds the key blank with a key blank clamp while at least one key blank cutter within the housing cuts the key blank to reflect the bit pattern of a master key. This disclosure is not concerned with various key blanks and it is intended to disclose methods of interaction between a key blank receiving aperture, a master key receiving aperture, a master key identification, a multi-key clamp, a key blank cutter, and a limited number of key blank models. This disclosure further reveals various groupings of a master key identifier, a key blank receiving aperture, a key blank cutter, and a key blank clamp in a key duplication system. The disclosure further sheds light on structure of a key clamp capable of interfacing with and securely holding keys made by different key manufacturers.

The specific cutting and checkout processes are also not crucial to the present disclosure and any discussion of them is provided as an example for clarity of discussion and is not intended as a limitation for use of the key receiving aperture, key clamp, key identifier or key clamp.

Figure 2:
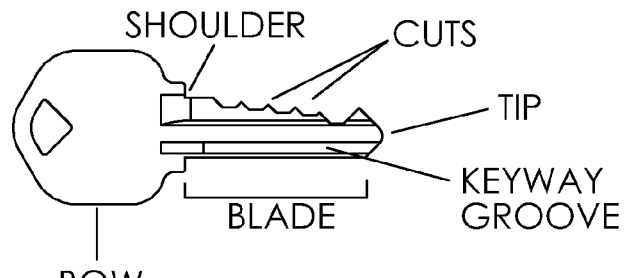
FIG. 2 is a side view of a master key.

FIG. 2 illustrates a general key of the type to be identified through the key identification system embodiment and methods described herein include several important parts as identified in the image immediately below this paragraph. Those parts include the key head or "bow", the shoulder, the blade and the tip. The key head, shoulder, blade, keyway grooves and tip, may be different for different makes and models of keys, but all have these corresponding parts. Some key blades, like those for particular automobiles for example, may have cuts on two opposing sides of the blade. On the key blade are the parts of the key that are the primary parts in identifying and duplicating the key, namely the key "cuts" or bit pattern, and the "keyway groove(s)." The bit pattern or cuts of the key blade are the code for the key that allow the key to manipulate a lock that has been keyed to that particular code. The keyway groove(s) alone may be enough to identify the particular make and model of the key blank to use for duplicating the key.

Figure 3:
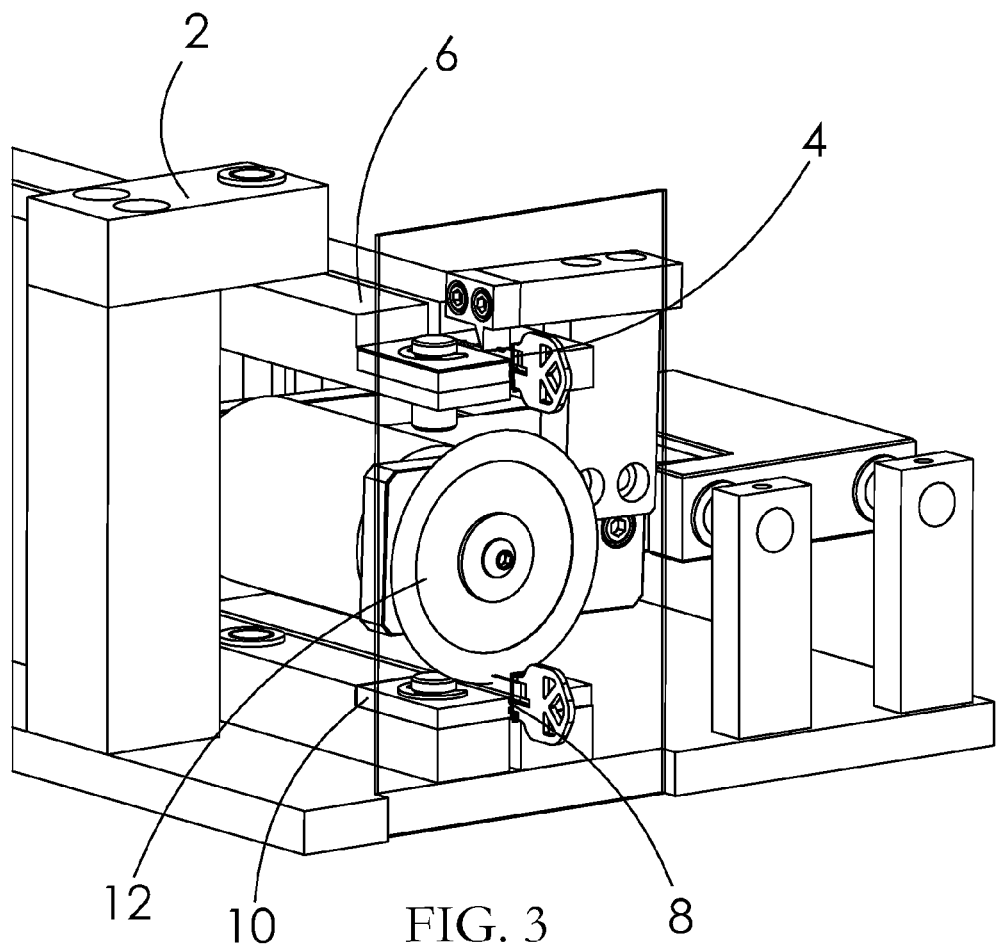
FIG. 3 is a perspective view of a first embodiment of a key cutting machine with portions of the housing removed and the front panel made see-through to show internal components of the machine.

FIG. 3 illustrates a particular implementation of key duplication housing 2 where in at least one master key receiving aperture 4 is located on one side of the housing to receive a master key blade, and a master key identification apparatus 6 is located adjacent to the at the least one master key receiving aperture to identify the key master key type and the bit pattern on the master key. By way of a non limiting example particular implementations of the key identification apparatus may further comprise simple contact sensor, such as a Hall-Effect sensor that traces the key bit pattern, or a simple non-contact sensor, such as a see-through (or thru-beam) sensor, or a combination thereof to trace a master key's bit pattern. Other implementations may include any other key identification method or structure known in the art including, but not limited to, image recognition and full or partial user identification of the master key from a display. Furthermore, at least one key blank receiving aperture 8 is located on the housing (same side for this particular implementation, though not required for all implementations), and at least one key blank clamp 10 is located adjacent to the least one key blank receiving aperture. The at least one key blank clamp 10 holds the key blank securely, by interfacing with at least one side surface of the key blank and engaging the keyway grooves of that side surface for a majority of the length of the key blade, and in some implementations substantially all of the length of the key blade, in a predetermined location in relation to the at least one key blank cutter 12 within the housing.

Figure 4A:
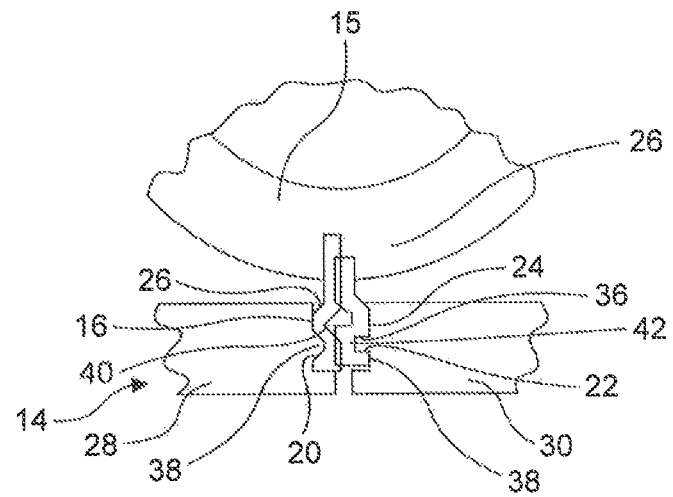
FIG. 4A is a simplified view of a key cutting system clamp illustrating how a specialized clamp mates with the keyway grooves of both types of keys.

In a particular implementation of the key duplication system, as illustrated in FIG. 4A, the at least one key clamp 14, implemented as a key blank clamp 14 in this illustration, possesses clamping surfaces 16, 18 that allow the at least one key clamp 14 to directly interface with and engage the surface 24, 26 and keyway grooves of a key blank blade 40, 42 in order to securely hold each of two specific and different key blank cross-sections in a determined position in relation to a cutting wheel 15 during the cutting process. The two key blank blades 40, 42 illustrated in FIG. 4A are both shown within the same clamp in FIG. 4A and slightly overlapping for illustrative purposes to show the distinct cross-sectional shapes of these two different key blades. Two keys would, of course, not simultaneously be placed in the clamp at the same time, but the overlapping key shapes in relation to the clamp emphasizes why it is difficult to securely clamp keys of differing cross-sectional shapes with the same clamp. This particular key clamp 14 embodiment is configured for, a Kwikset key blade 42 and a Schlage key blade 40. The at least one key clamp 14 further comprises at least two distinct clamping surface 16, 18 topographies such that the surfaces 16, 18 are configured to mate with and correspond to different key blade surfaces 24, 26. In a particular, non-limiting implementation of the key clamp, the surfaces 16, 18 of the left and right clamping arms 28, 30 may, respectively, comprise a topography shaped to mate with the respective single side surfaces of the blades of Schlage 40 and Kwikset 42 keys for additional support. Which clamp surface 16, 18 matches which corresponding key surface 24, 26 is not critical to the clamp 14, but an arrangement where the right clamp 30 and surface 22 topography engages the right key side keyway groove of a Kwikset 42 key side topography and the left clamp 28 surface 20 engages the left key side keyway groove of a Schlage 40 key side topography is most likely and provides the advantage of a more secure engagement for these two particular key types than the reverse configuration.

Particular implementations may be configured for engaging and simple, secure clamping of the blade keyway grooves for any two different key types by changing the respective left or right clamp surface to a different surface topography. For example, if a simplified, consumer operated key duplication system is needed for a small lock shop, two of the most commonly sold small lock key side topographies could be matched (one on one clamp side and the other on the other clamp side) to create an inexpensive, easy to operate key duplication system for a specialized key duplication location. As illustrated in FIG. 4A, in a particular implementation of the key clamp, key clamping surfaces 16, 18 may include mating keyway groove guides 36, 38 on the clamp surfaces that engage the key surface. Use of keyway groove guides 36, 38 that engage the keyway groove on a side of the key while cutting the key may alleviate the need for additional system components to straighten or re-align the master key in the clamp upon and after insertion because the pattern on the center support acts as a guide to ensure straightness in addition to physically restraining the key during the cutting process.

Figure 4B:
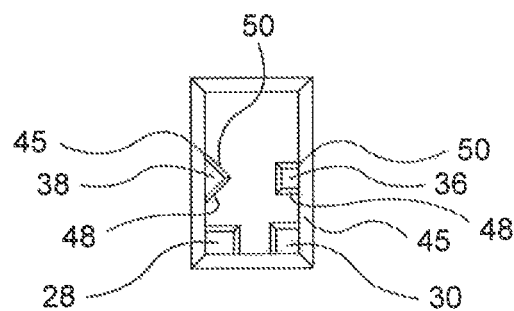
FIG. 4B is a view of a key receiving aperture of a key cutting system showing portions of the key clamp of FIG. 4A.

In particular implementations, for example as illustrated in FIG. 4B, a key receiving aperture 44 on a key duplication system, whether the key receiving aperture 44 is used for a master key in a key identifier or for a key blank in a key cutter, may comprise tapered side walls 45 about the perimeter 46 surrounding the key receiving aperture 44 to assist in guiding the key blade to the opening. The key blade clamp forward edges 48, 50 may also be tapered, for example as shown in FIG. 4B, to guide the key blade of a key inserted into the key blade aperture to be guided into mating with the keyway groove guides 36, 38 on the surfaces of the respective left 28 and right 30 clamps. In use as a key blank clamp, particular implementations of the key clamps disclosed herein may be used to confirm that the correct key blank is inserted into the clamp (in simple implementations by not mating with key blanks that do not match the opening shape), that the key is properly aligned for the cutting wheel 15 (FIG. 4A) by one of the keyway groove guides 36, 38 engaging with the correct key blank, and that the key is securely held by the clamp closing after the key is fully inserted with one of the keyway groove guides 36, 38 engaging a keyway groove on one side of the key for a majority of the length of the key blade, and in some implementations for substantially all of the length of the key blade where the key blade is cut. In use as a master key clamp, particular implementations of the key clamps disclosed herein may be used to identify the master key for the consumer to signal which key blank to choose, to confirm that the master key is properly aligned with a key bit identifier whether implemented as a mechanical or other tracing system or as an optical trace, optical image capture or other identifier, and to hold the master key still and prevent removal of the master key during the key identification and/or duplication process.

In some particular implementations, though not required, additional sensors may be included to assist in identification of a key type or verification that a particular key type is inserted. Because particular embodiments of the disclosed key duplication systems are configured to receive two different key types in the same key receiving aperture, there is a chance that a user may insert a master key of a first type and accidentally select a key blank of a second type. There are several different ways this problem may be addressed.

In a particular implementation of a key receiving aperture, by non-limiting example such as that illustrated in FIG. 4B, the key receiving aperture 44 may dynamically revise its perimeter's 46 shape after a consumer or system identifies a master key type through a digital interface coupled with a side of the duplication housing. The dynamic shape modification ensures correct key is being inserted, either as a master key receiver or as a key blank receiver, and that the insertion is taking place in an appropriate direction in relation to the key clamp. By way of a non-limiting example, the perimeter shape 46 of at least one key receiving aperture 44 may be partially defined by a surface shape of at least one key clamp element wherein one of the clamp elements with a profile corresponding to the surface topography of a particular key may be positioned in the way of key receiving aperture to allow only a key with a single matching profile to be inserted into the housing.

Figure 5:
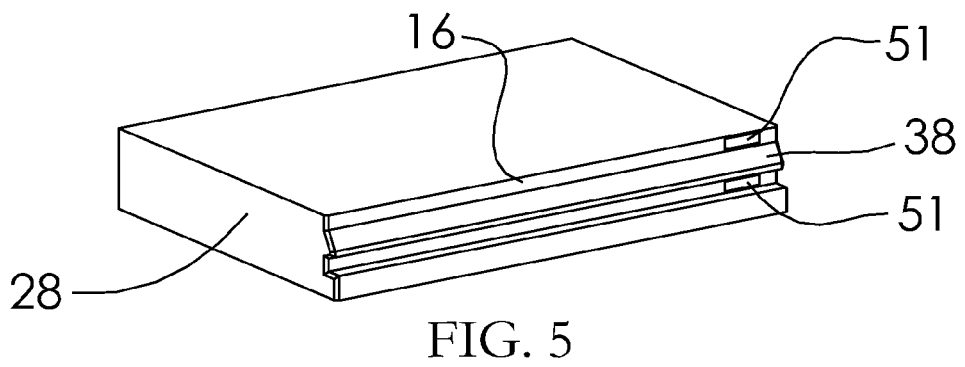
FIG. 5 is a perspective view of a key clamp surface with an optional sensor.

In particular implementations, whether used as a master key clamp or a key blank clamp, the clamp may be provided with additional key sensors located along the keyway groove guides of one or both sides of the clamp. Because the keyway groove guides of the clamp surface engage the keyway groove of the expected key type, one or more sensors placed within the keyway groove guide can be positioned to only be activated if the expected key is inserted. FIG. 5 illustrates a surface view of a left clamp 28 of the clamp of FIG. 4A, but with a non-limiting example of a pair of pressure sensors 51 placed within the keyway groove adjacent guide 38. Other sensor embodiments are also contemplated by this disclosure and are considered equivalent to a pressure sensor if they sense the presence of a key within a keyway groove guide so that the key type can be confirmed.

Figure 6:
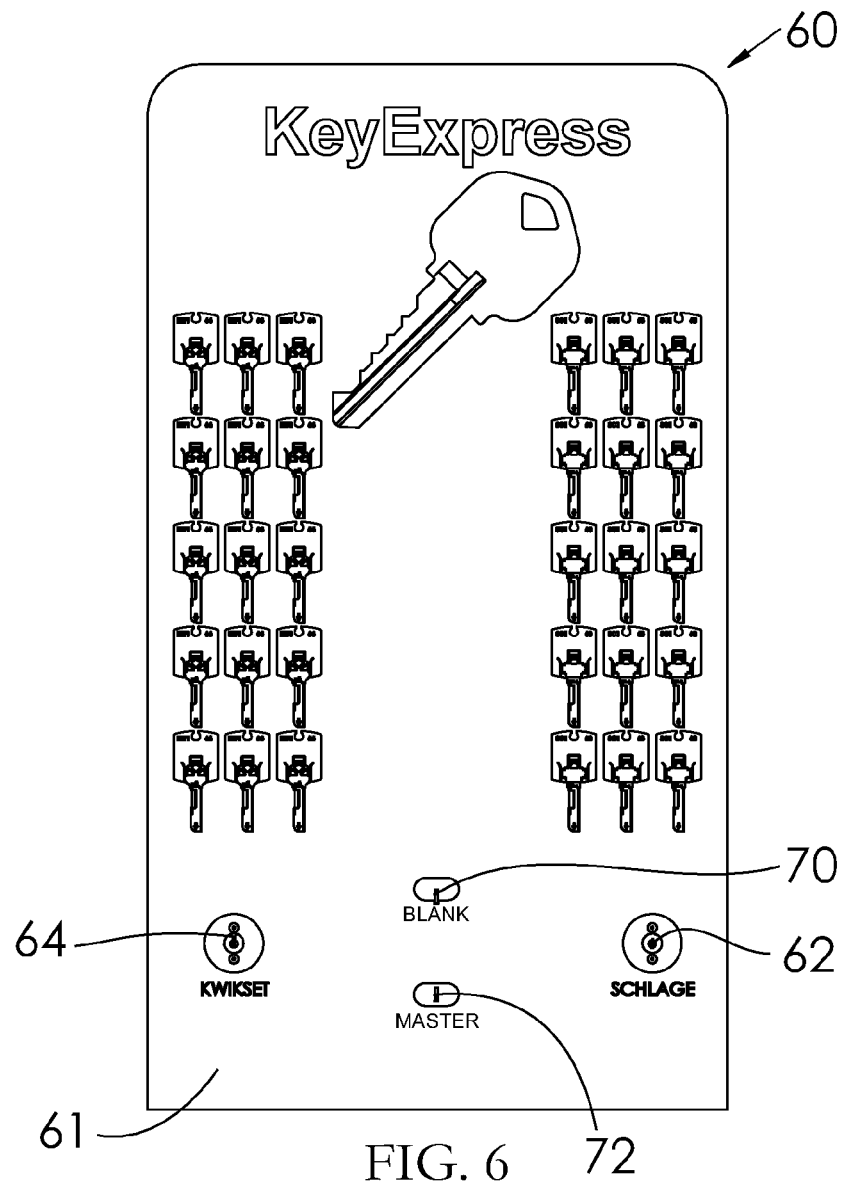
FIG. 6 is a view of a key duplication system and related key vending display for a two-key vending kiosk.

FIG. 6 illustrates a particular implementation of the key duplication system 60 associated with a key vending system wherein identification of a master key bit pattern takes place without dependency on a computerized database. In this particular implementation, at least two master key receiving apertures 62, 64 are mounted in one side 61 of the key duplication system 60, each master key receiving aperture 62, 64 corresponding to a distinct key brand, in this preferred embodiment the distinct brands are Schlage and Kwikset, which as illustrated above have very distinct key blade cross-sectional shapes.

In this particular implementation, a consumer approaches the key duplication system 60 and inserts the consumer's master key into one of the two master key receiving apertures 62, 64. If the key fits into the key receiving aperture, the key brand has been identified as being able to be duplicated at the machine. In one particular embodiment, the master key receiving apertures 62, 64 used for identification are simply the keyways of conventional locks corresponding to the two distinct brands. In particular implementations, an indicator illuminates adjacent to a set of key blanks available for choice by the consumer, or a message displays to the consumer on a display indicating from which key blanks the consumer may select a key blank for duplication. Having at least two master key receiving apertures each designated to receive a particular key brand alleviates the need for a database to store key brand information.

Once the master key is identified and the key blank is selected, the consumer places the key blank, either in a carrier or bare depending upon the configuration of the system and the key blanks, into a key blank receiving aperture 70. The key blank receiving aperture 70 is configured, using methods disclosed herein or in a related or incorporated application, to ensure the key blank being inserted into the key blank receiving aperture 70 is inserted facing the correct direction and positioned appropriately for the key cutter housed within the system 60. See, for example, the embodiment illustrated in FIG. 3. In the particular implementation illustrated in FIG. 6, a master key receiving aperture 72 is positioned below the key blank receiving aperture 70 for holding of the master key during the key blank cutting process. In other implementations, the master key may be left in the identification key receiving aperture 62 or 64 depending upon the method and hardware used to transfer the key bit pattern from the master key to the key blank. Those of ordinary skill in the art will readily be able to employ one of the methods known in the art, or a method and structure described herein to trace, capture, mechanically follow, or otherwise obtain the key bit pattern and either simultaneously or sequentially cause the cutting wheel to cut the master key bit pattern into the key blank blade. In the particular implementation illustrated in FIG. 6, the key blank receiving aperture 70 and the master key receiving aperture 72 includes clamps having clamp surfaces configured with a surface topography that matches the keyway groove patterns of the corresponding two keys for which the key duplication system is customized (Kwikset and Schlage in the embodiment of FIG. 6).

Figure 7A:
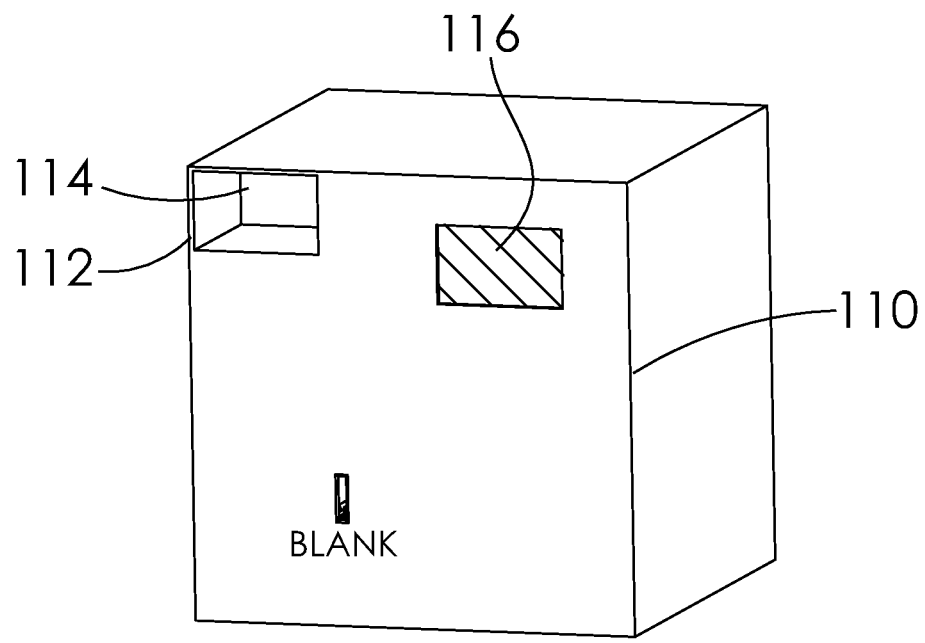
FIG. 7A is a perspective view of a key duplication system comprising a key scanner.
Figure 7B:
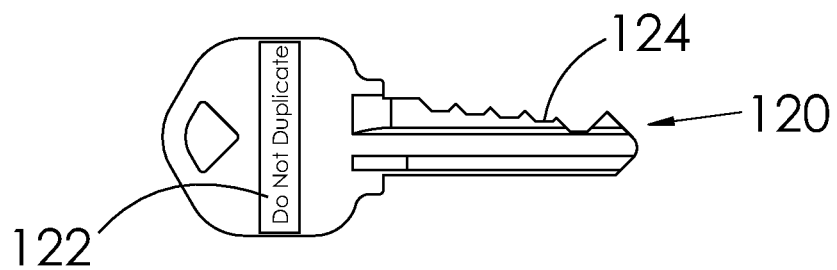
FIG. 7B is a perspective view of a "Do Not Duplicate" key.

In particular implementations of a key duplication system 110, a non-limiting example of which is illustrated in FIG. 7A, at least one master key receiving aperture 112 is coupled with a scanner 114, digital and/or optical, associated with a controller and processor of the key duplication system 110, such that the system digitally identifies the master key. Occasionally, a master key 120 includes the words "Do Not Duplicate" 122 (FIG. 7B) engraved or printed on the head of the key to indicate that duplication of the key is restricted. According to a particular method of and system for identifying a master key, the scanner 114 comprises an image capture function, such as through a camera or other image capture device, to determine whether a master key head includes the words "Do Not Duplicate" and stops the duplication process if the words exist on the key head. This process can be accomplished before, during or after the scanner 114 or a related component identifying the master key bit pattern 124 and its type for duplication. This feature may be added to any of the implementations of a key duplication system disclosed or discussed in this disclosure including in those incorporated by reference, by adding a simple camera adjacent to the master key receiving aperture (even adjacent to the master key receiving apertures of the implementations described with reference to FIG. 6) and a processor associated with the system can determine whether the "Do Not Duplicate" message is included on the key head through many different methods of image comparison or even text recognition known in the art. A system display 116 may be included in the system 110 to communicate instructions to the consumer or to direct the consumer to seek assistance if the key includes a "Do Not Duplicate" message. In particular embodiments of the scanner 114, the digital reader may also be configured to verify whether a duplicate key was cut accurately by the consumer placing the duplicate key in the master key receiving aperture 112 after the key blank is cut into a duplicate key. This may be accomplished by scanning the duplicate key in the same way the master key was scanned, and performing an image comparison to determine whether the duplicate key matches the master key within a predetermined, limited tolerance for error.

Figure 8:
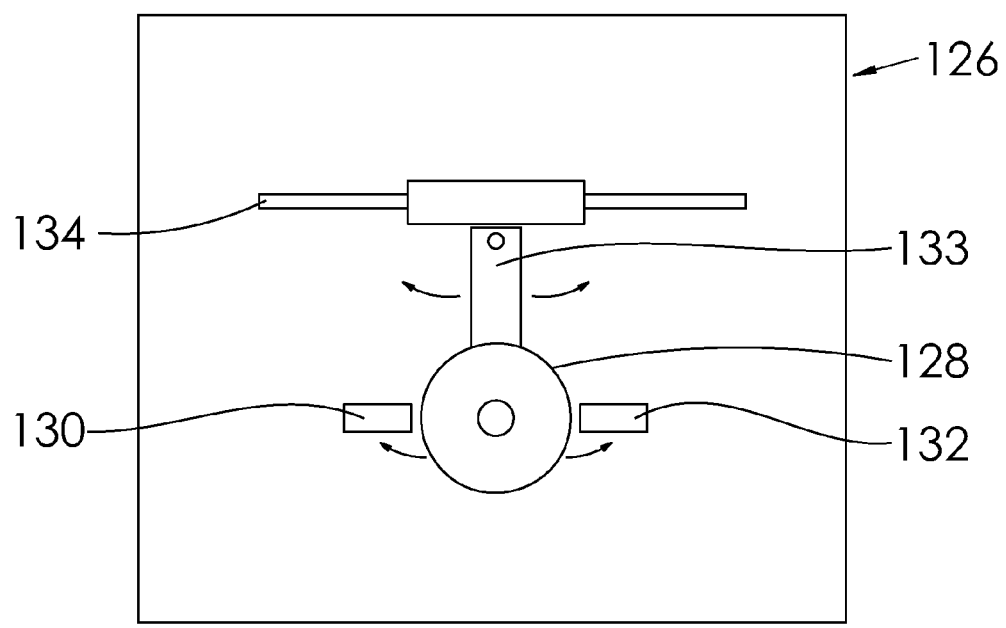
FIG. 8 is a front view of a key duplication system with a front panel removed and only specific parts illustrated for simplicity.

FIG. 8 illustrates a particular implementation the key duplication system 126 wherein the at least one key blank cutter 128 is positioned among the at least two key blank receiving apertures 130, 132. In a first implementation, the at least one cutter may relocate laterally along a support bar 134 in relation to the at least two key blank receiving apertures 130, 132 depending upon which of the at least two key blank receiving apertures has a key positioned therein for cutting. Multiple key blank receiving apertures may be used, for example, to allow each key blank receiving aperture 130 or 132 to be specifically designed for a particular key blank cross-sectional shape. For example, a first key blank receiving aperture may include a clamp specifically configured to hold a Schlage office key and a second key blank receiving aperture may include a clamp specifically configured to hold a Kwikset home key. Once the key blank is placed in a key blank receiving aperture, the system 126, through its motor controls, moves the key blank cutter 128 toward the key blank to be cut and pivots back and forth in that position as it cuts the key. Using the same key blank cutter 128, the system is also configured to move the key blank cutter 128 toward the other key blank receiving aperture to cut a different key from a different manufacturer. In another particular implementation, the at least one cutter 128 does not relocate laterally, but instead simply pivots between the first key blank receiving aperture 130 and the second key blank receiving aperture 132 depending on which one includes a key blank to be cut. The degree of rotation required to permit the same key blank cutter 128 to cut a key blank at two separate rotations along the pivoting path of the key blank cutter is larger than is required to simply cut a key blank at a single location. The specific degree of rotation required depends upon the placement of the particular key blank receiving apertures 130, 132 in relation to the key blank cutter 128, and the length of the support 133. In some particular implementations, two different pivoting components are used, one to pivot the support 133 to move the key blank cutter 128 between and closer to each of key blank receiving apertures 130, 132, and a different pivot, similar to that used in conventional key cutting machines, to pivot the key blank cutter 128 in relation to the key blank, and the support 133, for use after the key blank cutter 128 is in position adjacent a key blank receiving aperture 130, 132 and is cutting a particular key blank in a particular key blank receiving aperture. Once a key blank is received by one of the at least two key receiving aperture, the at least one key blank cutter 128 biases in the direction of the inserted key blank and retracts to its earlier positions once the cutting process is ceased. In particular implementations of the key duplication housing 126, the at least one key blank cutter may furthermore remove added features 136 on a key blank 138.

In places where the description above refers to particular implementations of key duplication system, key receiving aperture, and key blank carrier, it should be readily apparent that a number of modifications may be made without departing from the spirit thereof and that these implementations may be applied to other key duplication system, key receiving aperture, and key blank carrier or in combination.

The implementations listed here, and many others, will become readily apparent from this disclosure. From this, those of ordinary skill in the art will readily understand the versatility with which this disclosure may be applied.

The components included in particular implementations of key blanks and carriers may be formed of any of many different types of materials or combinations that can readily be formed into shaped objects and that are consistent with the intended operation of a key blank or carrier. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the various components forming a particular implementation of a key blank or carrier may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

It will be understood that implementations are not limited to the specific components disclosed herein, as virtually any components consistent with the intended operation of a method and/or system implementation for a key blank or carrier may be utilized. Accordingly, for example, although particular key blanks, carriers and other components may be disclosed, such components may comprise any shape, size, style, type, model, version, class, grade, measurement, concentration, material, weight, quantity, and/or the like consistent with the intended operation of a method and/or system implementation for a key blank or carrier may be used.

In places where the description above refers to particular implementations of key blank or carrier, it should be readily apparent that a number of modifications may be made without departing from the spirit thereof and that these implementations may be applied to other key blanks and carriers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

Particular implementations of the key cutting machine with a standard reference features may include a key blank cutter to cut a key blank carried within a key blank carrier or not within a key blank carrier, a key blank receiving aperture and a key blank carrier clamp to align a key blank or key blank carrier by holding at least a portion of the key or the blank carrier within the key cutting machine housing in a predetermined position with respect to the key blank cutter. The standard reference features of the key receiving aperture may allow certain key blank brands or key blanks contained in a key blank carrier to interface with the machine and may align key blanks or key blanks contained in a carrier within a key cutting machine with respect to a key blank cutter. An implementation of the key blank receiving aperture may receive different key brands or contained in a key blank carrier. An implementation of the key blank clamp secures a portion of a key blank or key blank carrier by interfacing with the surface of the key blank or the key blank carrier to prevent a key blank from moving while being cut within the key duplication housing.

The invention claimed is:

1. A key duplication system comprising:
   a key duplication housing;
   at least one key receiving aperture on a first side of the housing sized to receive a key blade; and
   at least one key clamp immediately adjacent to the at least one key blank receiving aperture such that a key blade inserted into the key receiving aperture extends into the at least one key clamp between a first clamp arm having a first surface topography shaped to mate with a keyway groove of a first key model and a second clamp arm having a second surface topography shaped to mate with a keyway groove of a second key model different from the first,
   wherein the first key model has a first key blade cross-sectional shape,
   wherein the second key model has a second key blade cross-sectional shape different from the first key blade cross-sectional shape of the first key model, and
   wherein when the at least one key clamp is closed on the key blade by moving the first clamp arm and the second clamp arm together, one of the first surface topography and the second surface topography securely mates with a keyway groove of the key blade to secure the key at a known position and orientation within the key receiving aperture.

2. The key duplication system of claim 1, wherein the at least one key clamp is a key blank clamp positioned immediately adjacent at least one key cutter.

3. The key duplication system of claim 2, further comprising a first master key receiving aperture mounted on the housing and shaped to receive and identify a key blade of the first key model, and a second master key receiving aperture mounted on the housing and shaped to receive and identify a key blade of the second key model.

4. The key duplication system of claim 3, wherein the first master key receiving aperture is shaped to receive a key blade of the first key model having a first key blade cross-sectional shape and the second master key receiving aperture is shaped to receive a key blade of the second key model having a second key blade cross-sectional shape.

5. The key duplication system of claim 3, further comprising a third master key receiving aperture mounted on the housing, the system further comprising at least a second key clamp immediately adjacent to the third master key receiving aperture such that a master key blade inserted into the third master key receiving aperture extends into the second key clamp between a third clamp arm having the first surface topography shaped to mate with the keyway groove of the first key model and a fourth clamp arm having the second surface topography shaped to mate with the keyway groove of the second key model, wherein when the second key clamp is closed on the master key blade by moving the third clamp arm and the fourth clamp arm together, one of the first surface topography and the second surface topography securely mates with a keyway groove of the master key blade to secure the master key at a known position and orientation within the third master key receiving aperture.

6. The key duplication system of claim 1, further comprising a second key receiving aperture mounted on the housing, the system further comprising at least a second key clamp immediately adjacent to the second key receiving aperture such that a second key blade inserted into the second key receiving aperture extends into the second key clamp between a third clamp arm having the first surface topography shaped to mate with the keyway groove of the first key model and a fourth clamp arm having the second surface topography shaped to mate with the keyway groove of the second key model, wherein when the second key clamp is closed on the second key blade by moving the third clamp arm and the fourth clamp arm together, one of the first surface topography and the second surface topography securely mates with a keyway groove of the second key blade to secure the second key at a known position and orientation within the second key receiving aperture.

7. The key duplication system of claim 1, wherein each of the first surface topography and the second surface topography comprises a keyway groove guide extending a majority of a length of the key blade when inserted.

8. The key duplication system of claim 7, further comprising at least one sensor positioned adjacent at least one of the keyway groove guides, the sensor configured for sensing the presence of the key.

9. The key duplication system of claim 1, further comprising a key vending system coupled to the housing.

10. A key duplication system comprising:
    a key identifier within a key duplication system housing; at least one key receiving aperture on a first side of the housing sized to receive a key blade and
    a key cutter within the key duplication system housing, the cutter responsive to the key identifier to cut a key bit pattern of a master key positioned in the key identifier into a blade of a first key blank positioned in a key blank clamp adjacent the key cutter,
    wherein the key blank clamp comprises a first clamp arm having a first surface topography shaped to mate with a keyway groove of a first key blank blade and a second clamp arm having a second surface topography shaped to mate with a keyway groove of a second key blank blade different from the first and to not mate with the keyway groove of the first key blank blade, wherein the first key blank blade has a first key blade cross-sectional shape, wherein the second key blank blade has a second key blade cross-sectional shape different from the first key blade cross-sectional shape, and wherein when the key clamp is closed on the first key blank blade by moving the first clamp arm and the second clamp arm together, the first surface topography securely mates with the keyway groove of the first key blank blade to secure the first key blank at a known position and orientation in relation to the key cutter.

11. The key duplication system of claim 10, wherein the key identifier comprises first and second master key receiving apertures, each aperture comprising a keyway shaped to receive a master key with a blade cross-sectional shape matching the key blade cross-sectional shape of one of the first key blank blade or the second key blank blade.

12. The key duplication system of claim 11, further comprising a third master key receiving aperture mounted on the housing, the system further comprising at least a second key clamp immediately adjacent to the third master key receiving aperture such that a master key blade inserted into the third master key receiving aperture extends into the second key clamp between a third clamp arm having the first surface topography shaped to mate with the keyway groove of the first key blank blade and a fourth clamp arm having the second surface topography shaped to mate with the keyway groove of the second key blank blade, wherein when the second key clamp is closed on the master key blade by moving the third clamp arm and the fourth clamp arm together, one of the first surface topography and the second surface topography securely mates with a keyway groove of the master key blade to secure the master key at a known position and orientation within the third master key receiving aperture.

13. The key duplication system of claim 10, further comprising a master key receiving aperture mounted on the housing, the system further comprising at least a second key clamp immediately adjacent to the master key receiving aperture such that a master key blade inserted into the master key receiving aperture extends into the second key clamp between a third clamp arm having the first surface topography shaped to mate with the keyway groove of the first key blank blade and a fourth clamp arm having the second surface topography shaped to mate with the keyway groove of the second key blank blade, wherein when the second key clamp is closed on the master key blade by moving the third clamp arm and the fourth clamp arm together, one of the first surface topography and the second surface topography securely mates with a keyway groove of the master key blade to secure the master key at a known position and orientation within the master key receiving aperture.

* * * * *